April 29, 1969  P. CERNEAU  3,441,191
DEVICES FOR LINKING AND GUIDING A CARRIAGE ON A METAL SHEET
Filed April 10, 1967

United States Patent Office 3,441,191
Patented Apr. 29, 1969

3,441,191
DEVICES FOR LINKING AND GUIDING A CARRIAGE ON A METAL SHEET
Pierre Cerneau, Podensac, France, assignor to The Societe de Chaudronnerie et de Montage Tissot & Cie, Soturac, France
Filed Apr. 10, 1967, Ser. No. 629,497
Claims priority, application France, Apr. 15, 1966, 57,848
Int. Cl. B23k 3/00, 37/02
U.S. Cl. 228—32
9 Claims

ABSTRACT OF THE DISCLOSURE

The disclosure relates to the driving of a carriage supporting a tool, namely a welding torch for joining two of such sheets to each other, said carriage being connected with a rail slidably engaging linking elements which may themselves be secured in a removable fashion from place to place to other linking elements permanently secured to the sheet. The first type of linking elements may be secured to the second type of elements by screwing.

---

Figure 1:
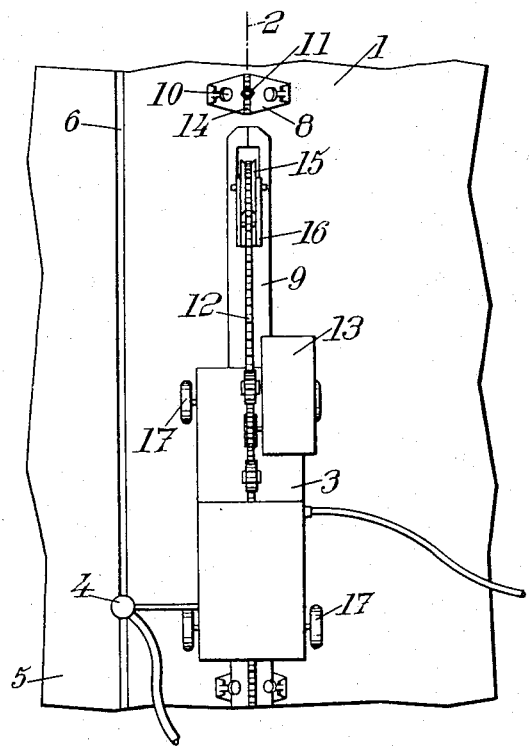

The invention relates to devices for linking to and guiding a carriage on a metallic sheet, in particular in view of joining said sheet to another by welding, along a line parallel to the trajectory of said carriage, the welding torch being then mounted on said carriage.

The object of the invention is to render these devices such that they better suit to the requirements of practice, in particular in connection with their easy and inexpensive use.

According to the invention, these devices comprise first elemental linking elements (preferably nuts or small tapped plates) which are permanently secured to the sheet on places thereon rigorously aligned along the desired trajectory for said carriage, second linking elements secured in a removable fashion to said first linking elements, preferably through mere screwing, and a rail, advantageously rigid, connected to said carriage, extending on a portion of the above trajectory and adapted to slide along said second linking elements (preferably on idle rollers supported by said second linking elements) for moving and guiding said carriage, the length of said rail being at least equal to the double of the distance separating two consecutive first linking elements, in the case where the distances separating the latter are constant.

The invention applies in a particularly advantageous manner to the automatic welding of largely sized metal sheets, such as the body parts of containers.

Further features and objects of the invention will appear as the description proceeds with reference to the drawing of a preferred embodiment of the invention, being understood that such description purports only to illustrate, yet not limit the invention.

Figure 2:
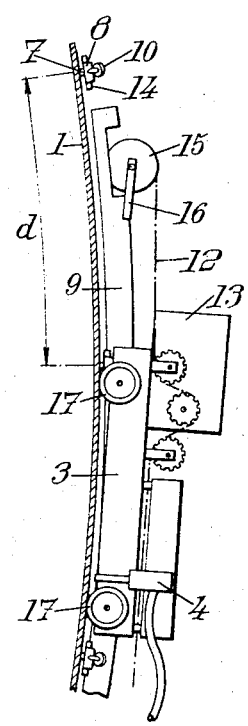
Figure 3:
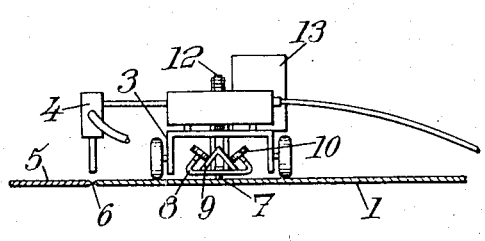

FIGS. 1, 2 and 3 of this drawing show, diagrammatically, a device contrived according to the invention for linking a carriage supporting a welding torch to a metal sheet and for guiding said carriage on said metal sheet, and according, respectively, to three directions perpendicular to one another.

Figure 4:
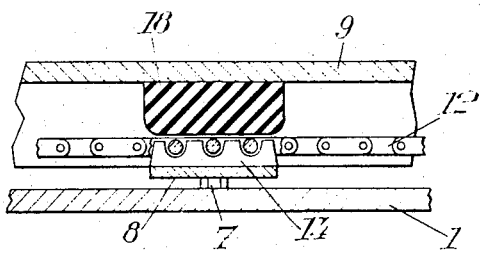

FIG. 4 shows a detail on a larger scale.

It will be assumed that it is desired to guide a carriage 3 supporting a welding torch 4 on a metal sheet 1 along a trajectory 2, said trajectory being preferably rectilinear or circular, with a view to joining to said sheet 1 another sheet 5 along a line 6 parallel to said trajectory.

Prior to entering within the description of the invention, it may be recalled that the above linking and guiding operations are usually performed by means of a continuous rail brought onto said sheet along the whole trajectory which is to be run by said carriage. This is costly and difficult to achieve in view of the great number of rails which must be used and of the difficulty of securing them to the sheets.

These inconveniences are overcome according to the invention by merely providing:

First elemental linking elements 7 permanently secured, for instance welded onto the sheet 1, in places along the trajectory 2, Second linking elements 8 which can be removably secured to said first elements, and A rail 9, supporting a carriage, extending along a portion of trajectory 2 and adapted to slide along the second linking elements 8.

The first linking elements 7 consist preferably of mere nuts or tapped small plates. Such elements are inexpensive; a great number of them may be welded onto the sheets which are to be welded, said first elemental linking elements being then "available for use." The second linking elements 8 are recoverable and thus may consist of more complex elements than the former. In the embodiment illustrated, they consist of rail-chairs or clamps constituted of plates comprising flanges obtained by the folding of their lateral borders, said flanges carrying idle rollers 10.

Said plates are provided with holes in their central portion to permit the passage of bolts 11 which can be screwed in the nuts 7.

The rail 9 is constituted by a section-iron or a corner-iron adapted to slide within the rail-chairs 8, said rail providing a path for the idle rollers 10.

In the embodiment represented, the rail 9 consists of an angle iron with equal sides and which turns its concavity toward the sheet.

In order that the rail engages constantly at least with two consecutive rail-chairs, such condition being necessary for correct guiding, said rail is given a length at least equal to twice the distance $d$ between two consecutive rail-chairs, if such distance is the same between each pair of neighbouring rail-chairs.

Means, for instance springs (not represented), are advantageously provided for resiliently connecting said rail to carriage 3.

The rail extremities may be bevelled for facilitating its introduction within the rail-chairs. If this rail is rigid, as is preferred in most cases, it extends along a segment of a straight line or of a circle, the trajectory 2 being accordingly rectilinear or circular.

In some instances, it may not be completely rigid. It may for instance be non-deformable along directions parallel to the metal sheet but deformable in directions perpendicular to said sheet, the rail being, in such instance, permanently urged elastically toward said sheet.

It will then be readily appreciated that carriage 3 is solidly linked to said sheet and guided thereon with great accuracy through the sliding of rail 9 within the successive rail-chairs 8, the latter having previously been bolted into the nuts "available for use" along the whole trajectory to be run by said carriage.

The displacement of the carriage and of the rail connected thereto may be controlled in any desirable manner; they may be towed by means of a cable or they may be driven by the driving wheels of the carriage, said wheels being in such instance provided with a tyre having a high coefficient of friction and firmly urged against the sheet.

In the embodiment illustrated, the displacements are ensured by means of an endless chain 12 driven by a motor 13 also supported by said carriage, said chain being adapted to mesh with the teeth of rack portions 14 provided on the rail-chairs 8.

In such instance, it is of course necessary that the distances between the rail-chairs 8 be determined with great accuracy and be equal to entire multiples of the pitch of the rack (or of the chain).

In order to provide for a good engagement of the chain with the rack portions, said chain is passed, on the one hand, about smooth double flanged tensioning rollers 15 carried by arms 16 which, themselves, are mounted pivotably on the extremities of rail 9 and elastically urged in a direction toward the sheet, and, on the other hand, between the rail and resilient pads 18 made, for instance of rubber and interposed between the rail and the chain, said chain being permitted to slide on said pads, whereby it cannot move away from the rack.

In order to reduce the friction involved in the motion of the carriage, it is advantageous to provide the same with rollers 17 which have preferably rubber tyres and which can roll directly on sheet 1.

One obtains thus a linking system of the carriage to the sheet which is particularly inexpensive (due to the low cost of the first elemental linking elements which are fixed permanently on the sheet), which can be readily put in operation (since it is sufficient to bolt the light second linking elements from place to place on the trajectory to be followed by the rail, and then to slide the rail into two of the these second bolted linking elements), such device being applicable to motions of the carriage in any space orientation.

It will be course be appreciated that the above carriage could be used for supporting apparatuses or tools other than a welding torch, such as, for instance, a cutting torch, a scaling tool, a spray gun etc.

While the invention has been described in connection with particular preferred embodiment, it will be understood that the invention is not limited to that embodiment, but is intended to encompass all alternatives, modifications and equivalents as may be properly included with the spirit and scope of the invention as defined by the appended claims.

What is claimed is:

1. A device for linking a carriage to a sheet and for guiding it thereon, said carriage supporting a tool adapted to act on said sheet, which comprises first linking elements permanently secured to said sheet and alined along the trajectory to be taken by said carriage on said sheet, second linking elements secured in a removable fashion to said first linking elements and a rail, connected to said carriage, extending on a portion of said trajectory and adapted to form a sliding engagment with said second linking elements for guiding said carriage along said trajectory, the length of said rail being such that it engages always at least two of said second linking elements.

2. A device according to claim 1 wherein said tool is a welding torch.

3. A device according to claim 1 wherein said first linking elements are nuts welded to said sheet and said second linking elements are rail-chairs bolted on said nuts.

4. A device according to claim 1 wherein said first linking elements are tapped plates welded to said sheet and said second linking elements are rail-chairs bolted on said tapped plates.

5. A device according to claim 1 wherein said second linking elements comprising idle rollers coacting with said rail, the latter forming a path for said rollers.

6. A device according to claim 5 wherein said rail is a rigid section-iron.

7. A device according to claim 6 wherein said rail is a corner-iron, with equal sides, which turns its concavity toward said sheet, said idle rollers coacting with the outside surfaces of said corner-iron.

8. A device according to claim 1 wherein said carriage supports a motor and has wheels provided with a tyre having a high coefficient of friction and driven by said motor for the displacement of said carriage and of said rail on said sheet along said trajectory.

9. A device according to claim 1 wherein said second linking elements comprise rack portions and said carriage comprises an endless chain, means which hold this endless chain under tension, a motor for driving said chain and means for holding said chain engaged with said rack portion of at least two second linking elements.

References Cited

UNITED STATES PATENTS

| | | | |
|---|---|---|---|
| 2,466,143 | 4/1949 | Young | 228—32 |
| 3,389,585 | 11/1945 | Anderson | 228—32 |
| 3,303,321 | 2/1967 | Harmsen | 219—125 |

RICHARD E. EANES, Jr., *Primary Examiner.*